US009403611B2

(12) United States Patent
Sacchetti et al.

(10) Patent No.: US 9,403,611 B2
(45) Date of Patent: Aug. 2, 2016

(54) UNIT FOR SEQUENCING AND GUIDING ITEMS

(71) Applicant: TETRA LAVAL HOLDINGS & FINANCE S.A., Pully (CH)

(72) Inventors: Elena Sacchetti, Correggio (IT); Stefano Rossi, Reggio Emilia (IT); Stefano Flore, Bologna (IT); Luca Capelli, Quattro Castella (IT); Davide Borghi, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 14/442,758

(22) PCT Filed: Nov. 28, 2013

(86) PCT No.: PCT/EP2013/074946
§ 371 (c)(1),
(2) Date: May 14, 2015

(87) PCT Pub. No.: WO2014/090581
PCT Pub. Date: Jun. 19, 2014

(65) Prior Publication Data
US 2015/0321857 A1 Nov. 12, 2015

(30) Foreign Application Priority Data
Dec. 12, 2012 (EP) .................................. 12196836

(51) Int. Cl.
*B65G 47/08* (2006.01)
*B65G 47/84* (2006.01)
(Continued)

(52) U.S. Cl.
CPC ............ *B65B 35/405* (2013.01); *B65G 47/082* (2013.01); *B65G 47/842* (2013.01); *B65G 47/845* (2013.01); *B65G 2201/0244* (2013.01); *B65G 2811/0615* (2013.01)

(58) Field of Classification Search
CPC .. B65B 35/405; B65G 47/842; B65G 47/082; B65G 47/084; B65G 47/086; B65G 47/088; B65G 47/265; B65G 47/26; B65G 47/08; B65G 2811/0605; B65G 47/845
USPC ........................................................ 198/419.3
See application file for complete search history.

(56) References Cited

U.S. PATENT DOCUMENTS 5,718,323 A    2/1998  Flix
5,871,079 A *  2/1999  Nannini ............... B65G 47/086
                                                    198/377.04

(Continued)

FOREIGN PATENT DOCUMENTS

GB       2 090 804 A      7/1982
WO    WO 2008/022296 A2   2/2008

OTHER PUBLICATIONS

International Preliminary Report on Patentability and the Written Opinion of the International Searching Authority (Forms PCT/IB/373 and PCT/ISA/237) issued on Jun. 16, 2015, by the International Bureau of WIPO in corresponding International Application No. PCT/EP2013/074946. (9 pages).

(Continued)

*Primary Examiner* — Mark A Deuble
(74) *Attorney, Agent, or Firm* — Buchanan Ingersoll & Rooney PC

(57) ABSTRACT

A unit for sequencing and guiding items, in which the items are grouped into batches of one or more items; the unit comprises a first conveyor for advancing the items from an input station to an output station, and a sequencing apparatus cooperable with the items to form the batches and to drive them to the output station; the sequencing apparatus comprises a second conveyor comprising a track and plural movable elements independently moved along the track; the track has a work portion parallel to the first conveyor, and the movable elements include respective interacting portions, adapted to protrude over the first conveyor when the movable elements are advanced along the work portion of the track, and cooperating with the items to drive them to the desired positions along the first conveyor to define the batches and to locate the batches at the desired distances from one another.

20 Claims, 11 Drawing Sheets

(51) Int. Cl.
  *B65B 35/40*   (2006.01)
  *B65G 47/86*   (2006.01)

(56) References Cited

U.S. PATENT DOCUMENTS

| | | | | |
|---|---|---|---|---|
| 5,893,701 | A * | 4/1999 | Pruett | B65B 23/14 198/419.1 |
| 6,182,814 | B1 * | 2/2001 | Koehler | B65B 23/14 198/418.7 |
| 2010/0140052 | A1 | 6/2010 | Martini | |
| 2015/0107959 | A1 * | 4/2015 | Engelhardt | B65G 47/082 198/377.01 |
| 2015/0136564 | A1 * | 5/2015 | Hurni | B65B 57/16 198/418 |
| 2015/0151929 | A1 * | 6/2015 | Aumann | B65B 61/20 198/803.3 |
| 2015/0274342 | A1 * | 10/2015 | Zuccotti | B65B 61/186 53/67 |

OTHER PUBLICATIONS

International Search Report (PCT/ISA/210) mailed on Jun. 4, 2014, by the European Patent Office as the International Searching Authority for International Application No. PCT/EP2013/074946.

Written Opinion (PCT/ISA/237) mailed on Jun. 4, 2014, by the European Patent Office as the International Searching Authority for International Application No. PCT/EP2013/074946.

\* cited by examiner

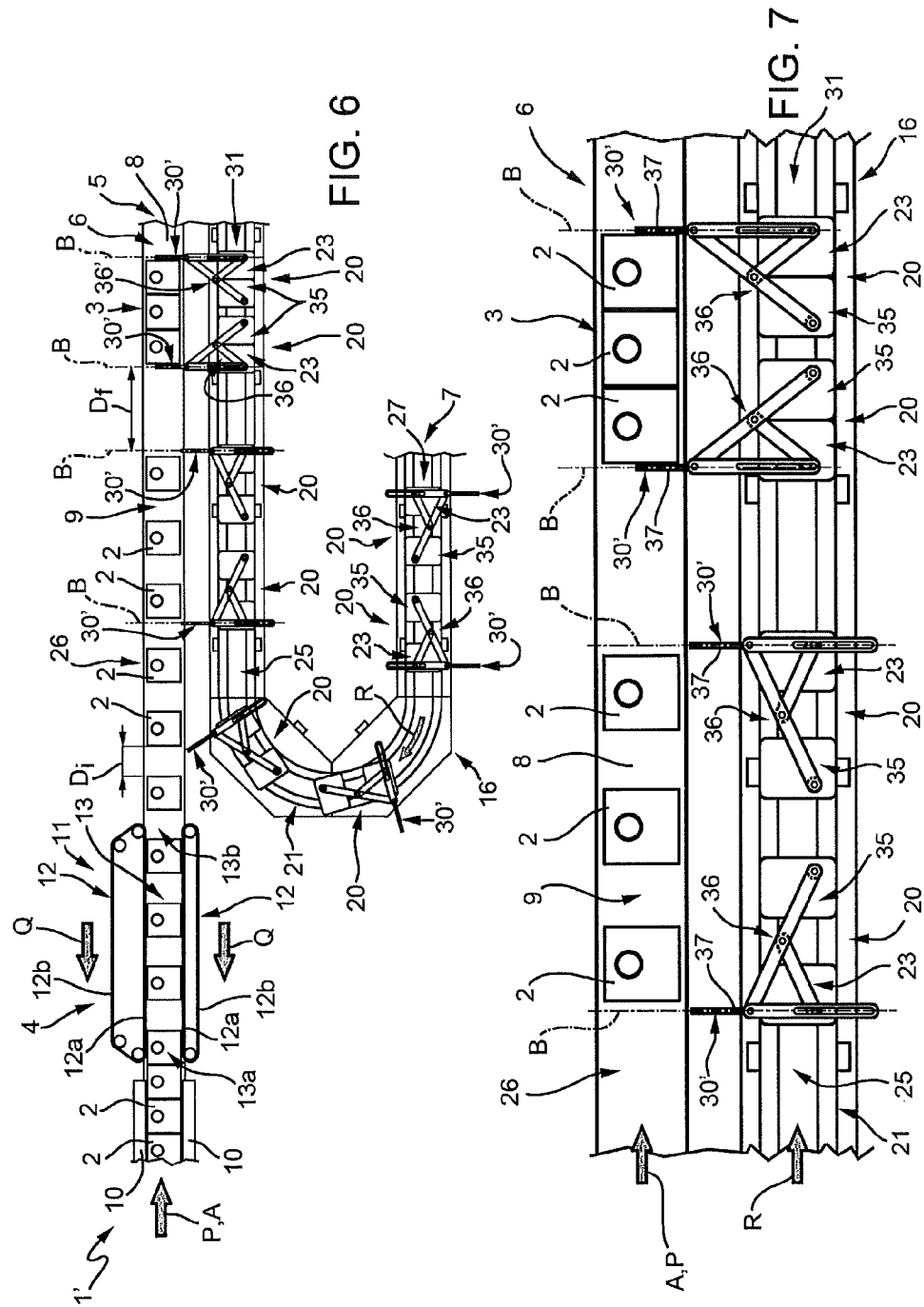

UNIT FOR SEQUENCING AND GUIDING ITEMS

TECHNICAL FIELD

The present invention relates to a unit for sequencing and guiding items, in particular packages containing liquid or pourable food products.

In the following description and claims, the term "package" is used in its widest sense to indicate any container for packaging liquid or pourable food products, and therefore includes, not only packets made of multilayer sheet material and similar, to which reference is made hereinafter purely by way of example, but also glass or plastic bottles, tins, etc.

BACKGROUND OF INVENTION

As is known, many pourable food products, such as fruit juice, pasteurized or UHT (ultra-high-temperature treated) milk, wine, tomato sauce, etc., are sold in packages made of sterilized sheet packaging material.

A typical example of this type of package is the parallelepiped-shaped package for liquid or pourable food products known as Tetra Brik Aseptic (registered trademark), which is made by folding and sealing laminated strip packaging material.

In particular, the packaging material has a multilayer structure comprising a base layer for stiffness and strength, which may include a layer of fibrous material, e.g. paper, or of mineral-filled polypropylene material, and a number of layers of heat-seal plastic material, e.g. polyethylene film, covering both sides of the base layer.

In the case of aseptic packages for long-storage products, such as UHT milk, the packaging material comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material; in particular, the web of packaging material is sterilized on the packaging machine, e.g. by applying a chemical sterilizing agent such as a hydrogen peroxide solution, which, once sterilization is completed, is removed from the surfaces of the packaging material, e.g. evaporated by heating; the web of packaging material so sterilized is maintained in a closed, sterile environment, and is folded and sealed longitudinally to form a vertical tube.

The tube is filled continuously downwards with the sterilized or sterile-processed food product, and is sealed and subsequently cut along equally spaced cross sections to form pillow packs, which are then fed to a folding unit to form respective finished, e.g. substantially parallelepiped-shaped, packages.

Alternatively, the packaging material may be cut into blanks, which are formed into packages on forming spindles, and the packages are filled with the food product and sealed. One example of this type of package is the so-called "gable-top" package known by the trade name Tetra Rex (registered trademark).

In both the above cases, given numbers of finished packages have to be grouped and packed in packing materials, e.g. cardboard and/or plastic film, to form modules for transport to retailers, also commonly known as "multi-packs".

For this purpose, the packages exiting from the folding unit have to be sequenced and grouped to form a plurality of package batches, which are formed by given numbers of packages and are designed to be combined together to form the multi-packs; in particular, the batches arrive at the station for the creation of the multi-packs arranged at the desired distances from one another; then, such batches are picked up by a manipulator to be combined with other batches to form the multi-packs.

Conveyor systems based on linear motor technology have been recently proposed for sequencing and grouping items, in particular packages or containers. These conveyor systems basically comprise a closed loop track, which houses a stator armature formed by a plurality of individually-excitable solenoids, and a plurality of movable elements or carts, which house respective permanent magnets and are independently moved along the track by individually controlling the solenoids. By loading the packages onto respective carts, it is possible to drive them in the desired way along the track, such as grouping a given number of packages to form a package batch and also defining a given distance between each group of carts carrying the packages forming one package batch and the carts forming the previous and following package batches.

This technology is extremely flexible as it permits to group any number of packages without carrying out any structural change to the conveyor system but simply varying the position/speed/acceleration profile imposed to each cart and enables high capacity solutions (high numbers of packages per hour).

However, the proposed solutions have the following drawbacks.

First of all, the packages have to be transferred from the traditional conveyor, by which they are advanced when they exit from the folding unit, to the individual carts. This operation requires to provide an additional conveying module interposed between the traditional conveyor and the linear motor conveyor system and which permits to load the packages on the carts without damaging them. This means to increase complexity and costs of the packaging lines.

Moreover, the carts have to be structured and designed to support the entire weight of the packages when they travel along the track; this entails high traction forces to drive the packages to the station for the creation of the multi-packs.

DISCLOSURE OF INVENTION

It is therefore an object of the present invention to provide a unit for sequencing and guiding items, which is extremely flexible and permits to overcome the aforementioned drawbacks in a straightforward and low-cost manner.

This object is achieved by a unit for sequencing and guiding items, as claimed in claim 1.

BRIEF DESCRIPTION OF THE DRAWINGS

A number of preferred, non-limiting embodiments of the present invention will be described by way of example with reference to the accompanying drawings, in which:

FIG. 6 shows a top view, with parts removed for clarity, of a first alternative embodiment of a unit in accordance with the present invention for sequencing and guiding packages while they are advanced from an input station to an output station;

FIG. 7 shows a larger-scale top view of a part of the FIG. 6 unit;

DETAILED DESCRIPTION OF PREFERRED EMBODIMENTS

Figure 1:
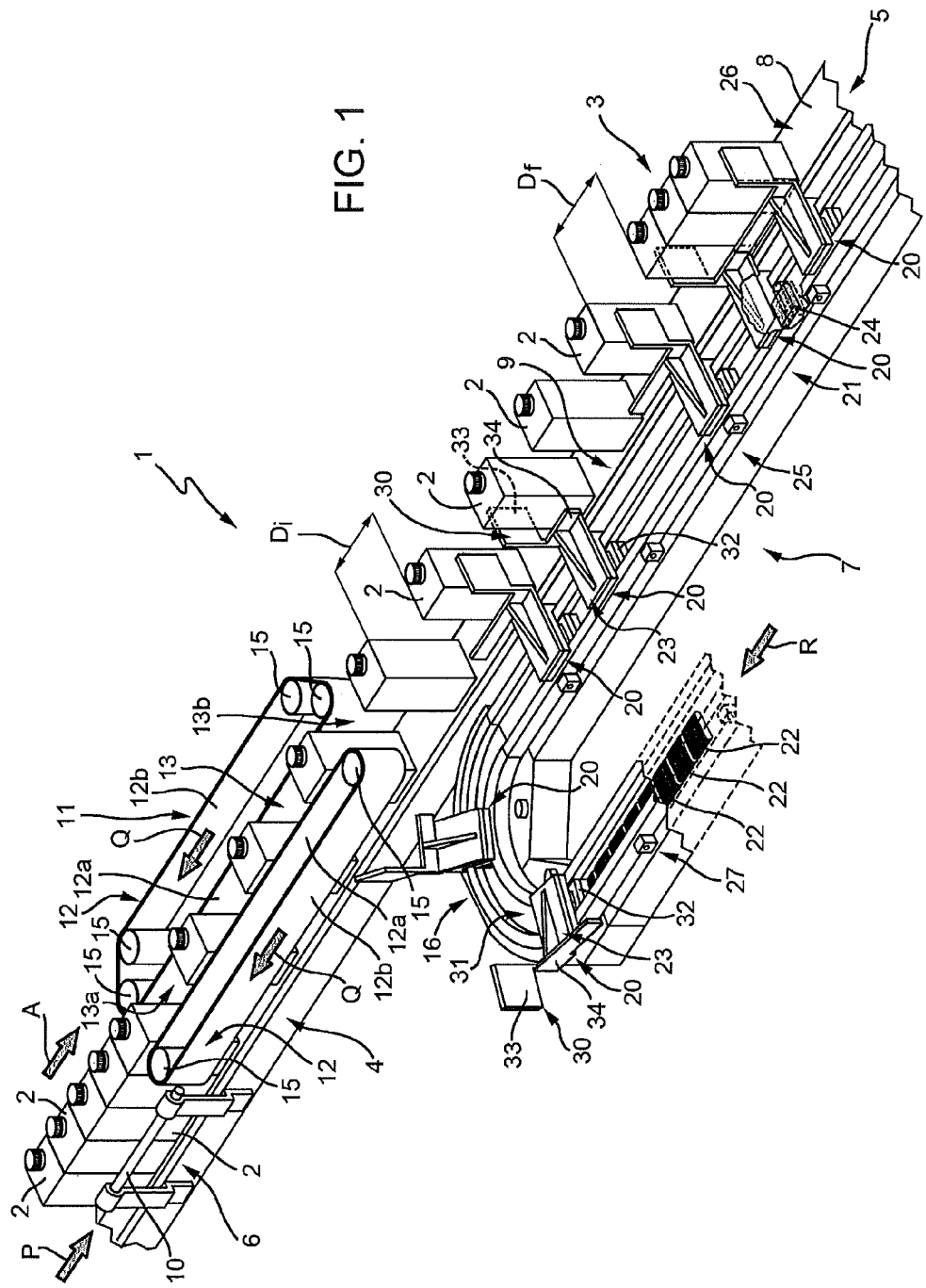
FIG. 1 shows a perspective view, with parts removed for clarity, of a unit in accordance with the present invention for sequencing and guiding packages while they are advanced from an input station to an output station.
Figure 2:
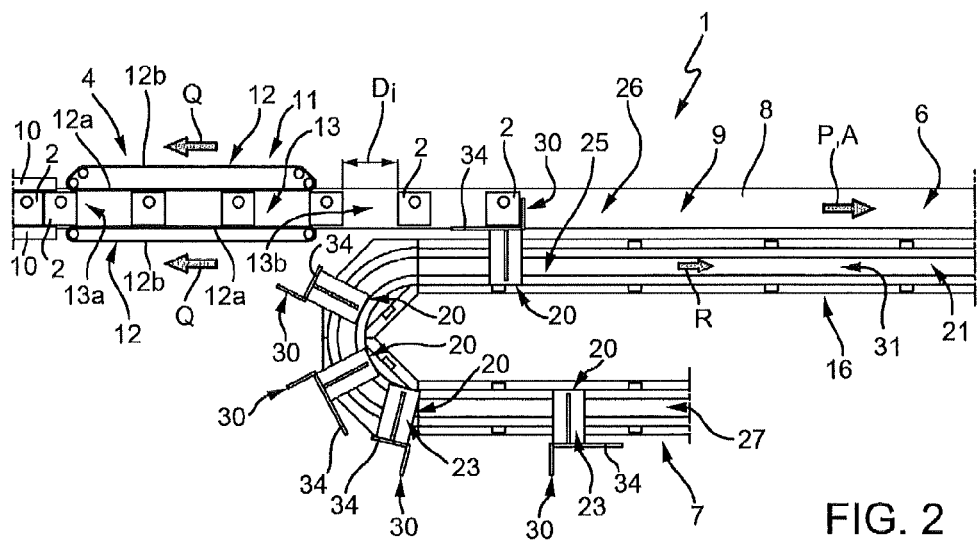
FIGS. 2 to 5 show respective smaller-scale top views of the FIG. 1 unit in different operating conditions and with parts removed for clarity.
Figure 3:
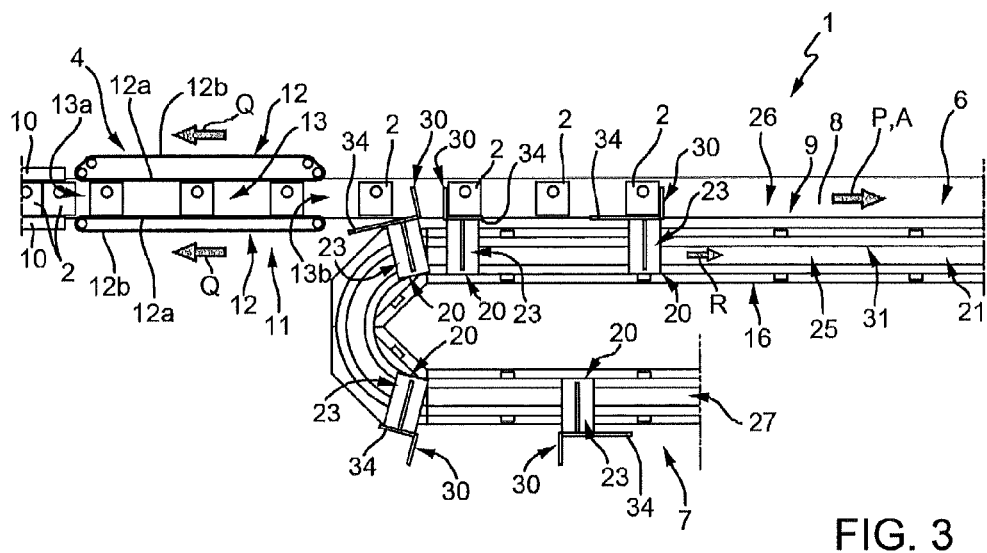

With reference to FIGS. 1 to 5, number 1 indicates as a whole a unit in accordance with the present invention for sequencing and guiding items, in the example shown packages 2, while such packages are advanced along a transfer path P—in the example shown, a straight transfer path.

More specifically, unit 1 provides for separating packages 2 into batches 3, of a predetermined number, for supply to a packing unit (known per se and not shown) where the batches 3 are wrapped by a sheet or film material (not shown), e.g. cardboard or plastic film, to form relative modules for transport to retailers.

In the example shown, batches 3 are formed by three packages 2 in contact with one another; it is pointed out that unit 1 is adapted to form batches 3 containing any number of packages 2, even only a single package 2.

In the example shown, packages 2 are defined by parallelepiped-shaped packets made, as described previously in detail, of multilayer sheet packaging material, which is filled with a pourable food product, such as pasteurized or UHT milk, fruit juice, wine, etc., and sealed.

As another possible alternative, packages 2 may also contain a food product, which is pourable when producing packages 2 and sets after packages 2 are sealed. One example of such a food product is a portion of cheese, which is melted when producing packages 2 and sets after packages 2 are sealed.

As a further possible alternative, packages 2 may be defined by a number of packets held together by a packing material, e.g. plastic film, or may be defined by other types of packaging containers, such as bottles, tins, etc.

Unit 1 basically comprises:
an input station 4, in which packages 2 are received at least in one line parallel to an advancing direction A;
an output station 5, in which batches 3, arranged according to desired spacings $D_f$ along the advancing direction A, are made available for a subsequent operation, such as a transfer operation to a station in which a module for transport to retailers is formed;
a conveyor 6 for advancing packages 2 along path P; and
a sequencing apparatus 7 adapted to cooperate with the packages 2 to form batches 3 and to drive packages 2 and batches 3 to output station 5.

In the example shown, path P and advancing direction A are horizontal.

With particular reference to FIGS. 1 to 5, conveyor 6 comprises a belt 8 looped about a number of rollers (not shown)—at least one of which is powered—and defining, for packages 2, a flat horizontal top conveying surface 9.

Conveyor 6 advantageously carries packages 2 to the input station 4 and from the latter to the output station 5, and sequencing apparatus 7 acts on packages 2 while they are transported and supported by the conveyor 6.

As visible in FIGS. 1 to 5, as they travel on conveyor 6 towards the input station 4, packages 2 are kept in one longitudinal line, parallel to advancing direction A, by two lateral rails 10; in particular, packages 2 are advanced between lateral rails 10 while resting upright on horizontal conveying surface 9.

After input station 4, the position of packages 2 on conveying surface 9 is controlled by sequencing apparatus 7, as it will be explained in greater detail later on.

With reference to FIGS. 1 to 5, input station 4 comprises a braking device 11 adapted to cooperate with packages 2 on conveyor 6 so as to generate an initial spacing $D_i$ between each package 2 and the following one.

In particular, braking device 11 comprise two belts 12 adapted to act on opposite sides of packages 2 carried by conveying surface 9 and defining therebetween a passage 13 for the line of packages 2.

Each belt 12 is preferably moved continuously along a closed loop path Q and comprises a work portion 12a, parallel to direction A and path P, and a return portion 12b. Both work portions 12a of belts 12 extend orthogonally to conveying surface 9 and define with the latter the passage 13 for packages 2.

Moreover, passage 13 comprises an inlet end 13a, at which belts 12 begin to cooperate with the line of packages 2 fed to input station 4, and an outlet end 13b, at which belts 12 release a relative package 2 separated by the line.

Each work portion 12a of belts 12 also extends between inlet end 13a and outlet end 13b of passage 13.

Each belt 12 is wound in a known manner around respective pulleys 15, at least one of which is powered; pulleys 15 have respective vertical axes, orthogonal to conveying surface 9.

Belts 12 are moved continuously at a speed lower than the speed of conveyor 6 so as to generate a queue of packages 2 at the inlet end 13a of passage 13 and to separate one package 2 at a time from the queue.

Sequencing apparatus 7 basically comprises a second conveyor 16 of linear-motor type, which is arranged in a position adjacent to conveyor 6 and carries a plurality of movable elements 20 adapted to cooperate with packages 2 on conveyor 6 in order to form batches 3 and to drive packages 2 and batches 3 to output station 5.

In particular, conveyor 16 basically comprises a closed loop track 21, along which movable elements 20 are independently moved; in practice, track 21 defines a closed loop path R for movable elements 20. In the example shown, track 21 extends horizontally and on one side of conveyor 6 and is substantially coplanar with conveying surface 9.

More specifically, in the example shown, track 21 houses a stator armature formed by a plurality of individually-excitable solenoids 22 (known per se and only schematically shown in FIG. 1), and movable elements 20 comprise respective carts 23 housing respective permanent magnets 24 (known per se and only schematically shown in FIG. 1) and independently moved along track 21 by individually controlling the solenoids 22.

According to a possible alternative not shown, track 21 may be also provided with the permanent magnets and carts 23 may house the individually-excitable solenoids.

As visible in FIGS. 1 to 5, track 21 has a work portion 25 extending parallel to a portion 26 of conveying surface 9 of conveyor 6 and arranged at a side of the conveyor 6; track 21 also has a return portion 27 for allowing carts 23 to move cyclically along path R.

According to a possible alternative not shown, work portion 25 of track 21 may also extend above portion 26 of conveying surface 9 of conveyor 6, or in any other position allowing interaction of carts 23 with packages 2.

In any case, work portion 25 of track 21 is distinct from conveyor 6.

Carts 23 are advantageously provided with respective interacting portions 30 adapted to protrude over portion 26 of conveying surface 9, when such carts 23 are advanced along work portion 25 of track 21, and cooperating with packages 2 to drive them to the desired positions along the conveying surface 9 so as to define a plurality of batches 3 and to locate the batches 3 at the desired distances $D_f$ from one another.

Work portion 25 of track 21 is arranged downstream from belts 12 of braking device 11 in advancing direction A of packages 2, so that carts 23 can interact with the packages 2 after the packages 2 have left braking device 11, or more precisely have been released by belts 12.

With particular reference to FIG. 1, track 21 defines an endless groove 31 configured to receive carts 23 in a sliding manner and defining closed loop path R for the carts 23; more specifically, each cart 23 has an engaging portion 32 complementary in shape to groove 31 and coupled therewith in a sliding manner.

As visible in FIGS. 1 to 5, two independent carts 23, provided with their respective interacting portions 30, cooperate with each batch 3 of packages 2 to drive it to output station 5. In particular, for each batch 3 to be formed having a given number of packages 2, in the example shown three, one of the carts 23 cooperates, through its interacting portion 30, with a leading surface of a leading package 3 of such batch 3 with respect to the advancing direction A, and the following cart 23 cooperates with a trailing surface of a trailing package 2 of the same batch 3; such two carts 23 are independently driven to move closer to one another so as to group the packages 2 comprised therebetween and to form the batch 3.

As a possible alternative not shown, a batch 3 may be also formed by a single package 2; in this case, one of the carts 23 cooperates with a leading surface of the package 2 with respect to the advancing direction A, and the following cart 23 cooperates with a trailing surface of the same package 2. This solution only permits to guide and drive each package 2 in a controlled way from input station 4 to output station 5 and to place such package 2 at the desired distance $D_f$ from the adjacent packages 2.

In the embodiment shown in FIGS. 1 to 5, each interacting portion 30 is carried in a stationary position by the relative cart 23 and protrudes over conveyor 6 when such cart 23 is advanced along work portion 25 of track 21.

In particular, each interacting portion 30 is formed by a cantilever 33 integral with the body of the relative cart 23 and protruding therefrom orthogonally to the advancing direction of the cart 23 along path R.

For carts 23 designed to cooperate with the leading surface of the batch 3, cantilevers 33 are positioned at the leading ends of such carts 23 with respect to the advancing direction along path R; for carts 23 designed to cooperate with the trailing surface of the batch 3, cantilevers 33 are positioned at the trailing ends of such carts 23 with respect to the advancing direction along path R.

All the carts 23 also have a rail portion 34 extending parallel to work portion 25 of track 21 when the carts 23 advance along such portion and adapted to define an abutment side surface for the packages 2. Rail portion 34 of each cart 23 is also orthogonal to the relative cantilever 33.

For each pair of carts 23 cooperating with one batch 3 of packages 2, the rail portions 34 of one of the carts 23 protrudes towards the other cart 23 so as to define, together with the rail portion 34 of this latter cart 23, a complete side rail for the entire batch 3 of packages 2. In the example shown, the protruding rail portion 34 is provided on the carts 23 designed to cooperate with the leading surface of the batch 3 of packages 2.

Operation of unit 1 will be described with reference to the formation of one batch 3 of a given number of packages 2, three in the example shown, and as of an initial condition (FIG. 2), in which the packages 2 destined to form said batch 3 have been all released by braking device 11 with initial spacing $D_i$.

Before the leading package 2 of the batch 3 to be formed is released by braking device 11, the cantilever 33 of a first cart 23 passes over conveying surface 9 so as to precede such package 2 in the advancing direction A. Hence, the cantilever 33 of the first cart 33 receives the leading package 2 of the batch 3 to be formed.

After the third package 2 has been released by braking device 11, the cantilever 33 of a second cart 23 passes over conveying surface 9 (FIG. 3) so as to contact the trailing surface of such package 2 with respect to the advancing direction A.

Figure 4:
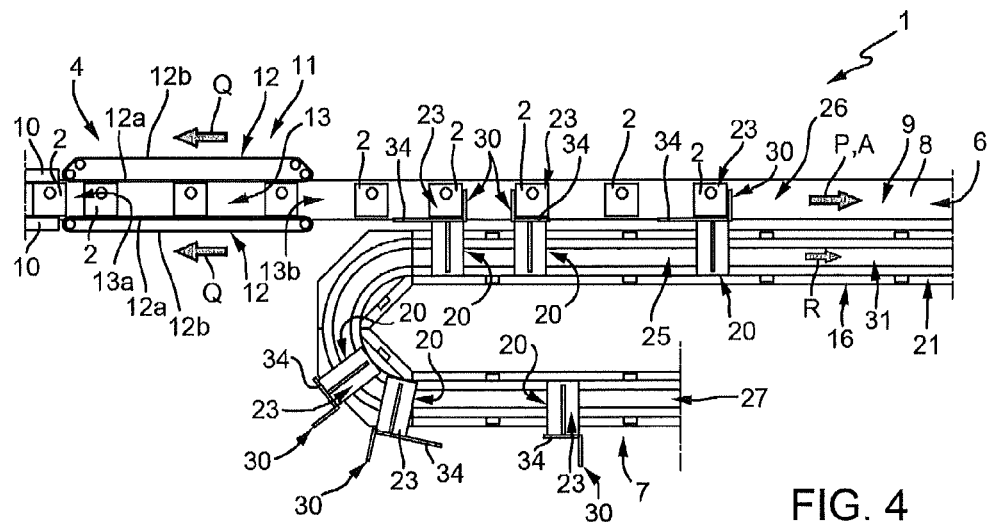
Figure 5:
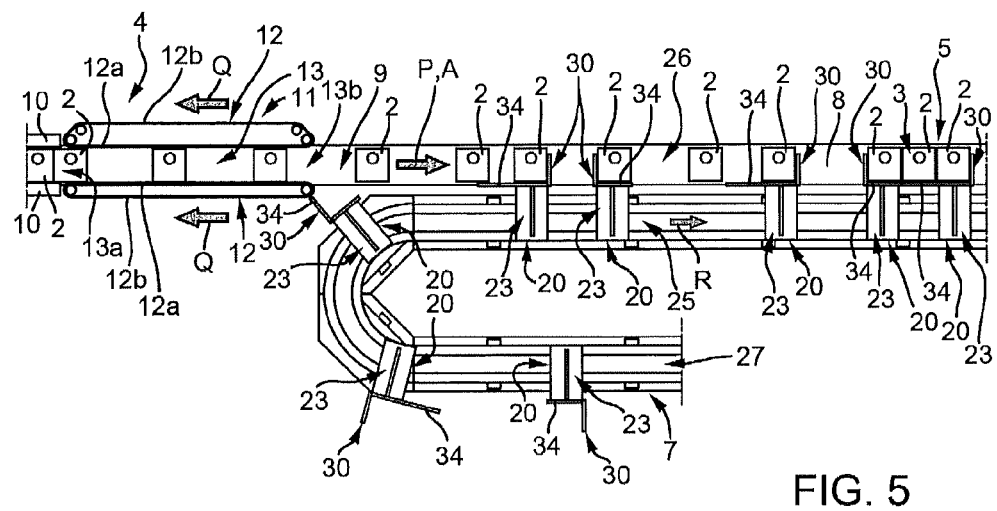

At this point, the cart 23 cooperating with the trailing package 2 is driven to move closer to the first cart 23 so as to group the packages 2 therebetween (FIGS. 4 and 5).

The approaching movement of the trailing cart 23 towards the leading cart 23 in order to form one batch 3 can be controlled on the basis of the position of the trailing package 2 of the batch 3 on the conveying surface 9, e.g. on the basis of the distance of such package 2 with respect to the previous one, or as a function of the force applied by the relative cantilever 33 on the trailing package 2 of the batch 3 to be formed.

When the batch 3 reaches, under the control of the two carts 23, output station 5, here a manipulator (known per se and not shown) picks up the batch 3 and transfers it to the area in which modules for transport to retailers are formed.

Number 1' in FIG. 6 indicates as a whole a different embodiment of a unit in accordance with the present invention for sequencing and guiding packages 2 while such packages are advanced along transfer path P; units 1 and 1' being similar to each other, the following description is limited to the differences between them, and using the same references, where possible, for identical or corresponding parts.

Figure 8:
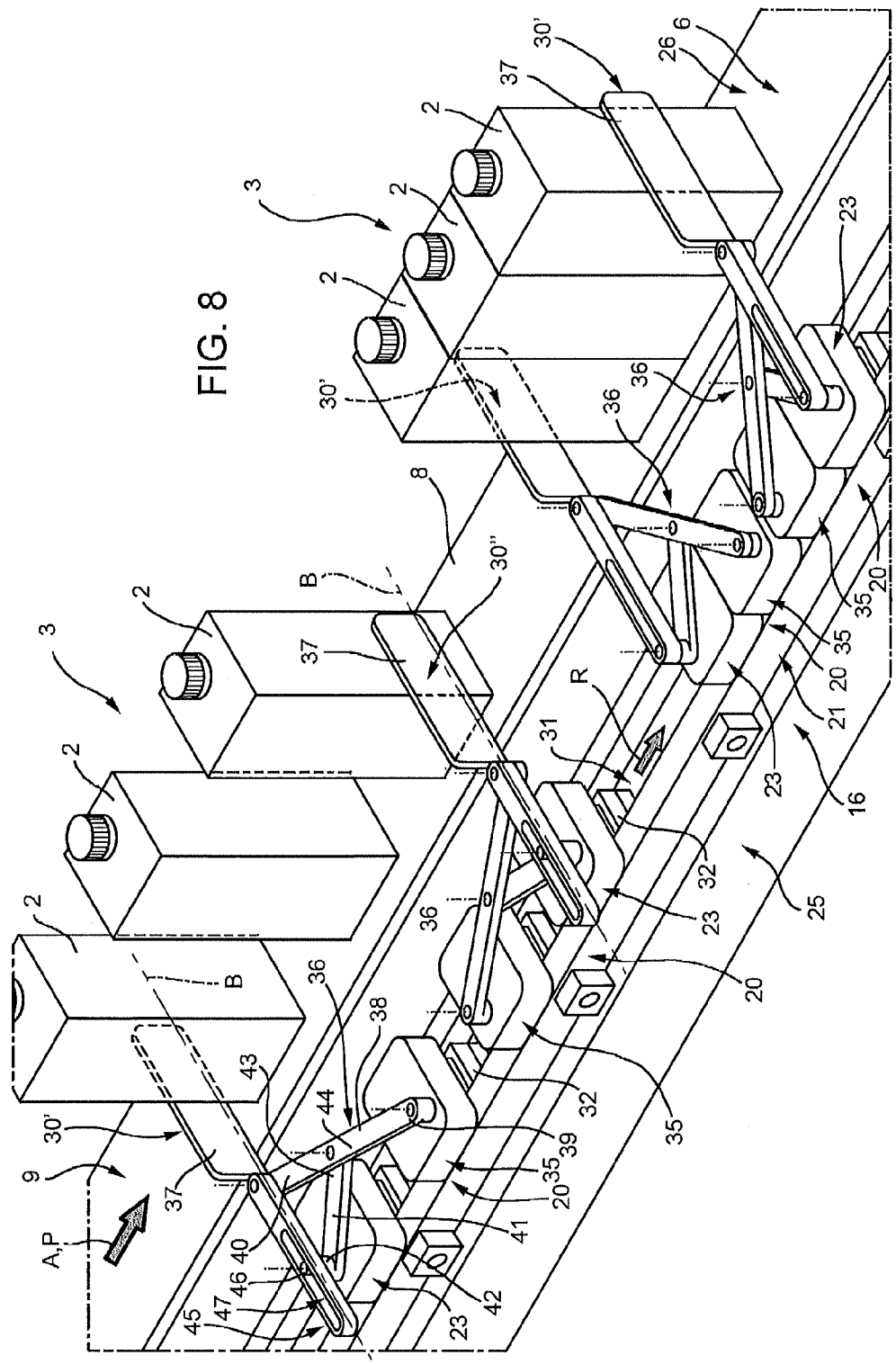
FIG. 8 shows a larger-scale perspective view of the part of the unit depicted in FIG. 7.

With reference to FIGS. 6 to 8, unit 1' basically differs from unit 1 by comprising, for each movable element 20, an interacting portion 30', which has the same function as interacting portions 30 of unit 1 but differs from the latter for being carried by the relative movable element 20 in a movable manner along a relative displacement direction B transversal to track 21.

Unit 1' also differs from unit 1 by the fact that each movable element 20 comprises two carts 23, 35, which are provided with respective permanent magnets 24, can be independently driven along track 21 and are linked to one another and to the relative interacting portion 30' by a linking mechanism 36.

In particular, each interacting portion 30' is defined by an arm 37, which is carried by one of the two carts 23, 35 of each movable element 20, in the example shown by cart 23, and is movable along the relative direction B between a rest position, in which the arm 37 cannot interfere with the packages 2 advanced by conveyor 6, and an operative position, in which the arm 37 protrudes over conveyor 6 for cooperating with the packages 2.

The movement of each arm 37 is controlled by varying the distance between the relative carts 23, 35, so as to obtain, through the linking mechanism 36, displacement of the arm 37 towards the operative position when the two carts 23, 35 move closer to one another and an opposite displacement when such carts 23, 35 move away from one another.

Each linking mechanism 36 comprises:
- a first lever 38 having a first end portion 39 hinged to the relative cart 35 and a second end portion 40 hinged to the relative arm 37;
- a second lever 41, extending transversal to lever and having a first end portion 42 hinged to the relative cart 23 and a second end portion 43 hinged to an intermediate portion 44 of lever 38; and
- guiding means 45 carried by cart 23 and receiving the arm 37 in a sliding manner along the relative direction B.

Levers 38, 41 and arms 37 are hinged about respective vertical axes, orthogonal to conveying surface 9.

In the example shown in FIGS. 6 to 8, guiding means 45 of each movable element 20 are defined by a fixed pin 46 for hinging end portion 42 of lever 41 to the relative cart 23; in this case, the relative arm 37 has a slot 47 coupled with the pin 46 in a sliding manner along the relative direction B.

By considering each batch 3 to be formed, the carts carrying the respective interacting portions 30' respectively define the leading part and the trailing part of the two movable elements 20 respectively cooperating with the leading surface and the trailing surface of such batch 3; the relative carts 35 of such two movable elements 20 are therefore arranged facing one another along the advancing direction of movable elements 20 along path R.

As a possible alternative not shown, the same displacement of interacting portions 30' along the respective directions B may be obtained by using a single cart 23 for each movable element 20 and by providing fixed cam means arranged adjacent to the work portion 25 of track 21 and configured to interact with interacting portions 30'.

It is pointed out that other types of actuator means may be used for obtaining displacement of interacting portions 30' along relative directions B, while the respective movable elements 20 are advanced along work portion 25 of track 21.

The operation of unit 1' is completely analogous to the one of unit 1, except for the fact that displacement of arms 37 to the operative positions can be performed just at the precise moment when it is necessary to interact with packages 2 to group them to form batches 3 and to drive such batches 3 to the output station 5. In particular, movable elements 20 can move along a first part of work portion 25 of track 21 without interacting with packages 2 moved by conveyor 6; displacement of arms 37 to their operative positions can be performed later, when the grouping action on packages 2 has to be performed.

This solution is extremely flexible as possible interferences occurring between the packages 2 and the interacting portions 30' before the time in which they have to start interaction need not to be considered; in practice, interacting portions 30' and packages 2 can move independently from one another up to the time in which the interacting portions 30' have to start interaction with the packages 2.

With particular reference to FIGS. 7 and 8, displacement of the interacting portion 30' of each movable element 20 from the rest position to the operative position is obtained by driving the relative cart 35 so as to come closer to the relative cart 23; in this way, lever 38 of the relative linking mechanism 36 rotates towards portion 26 of conveying surface 9 so producing a translation of arm 37 towards conveying surface 9; this movement ends when the two carts 23, 35 come into contact with one another. The opposite movement of each interacting portion 30' is obtained by moving the relative cart 23 away from the relative cart 35 so producing an opposite rotation of the relative lever 38.

Figure 9:
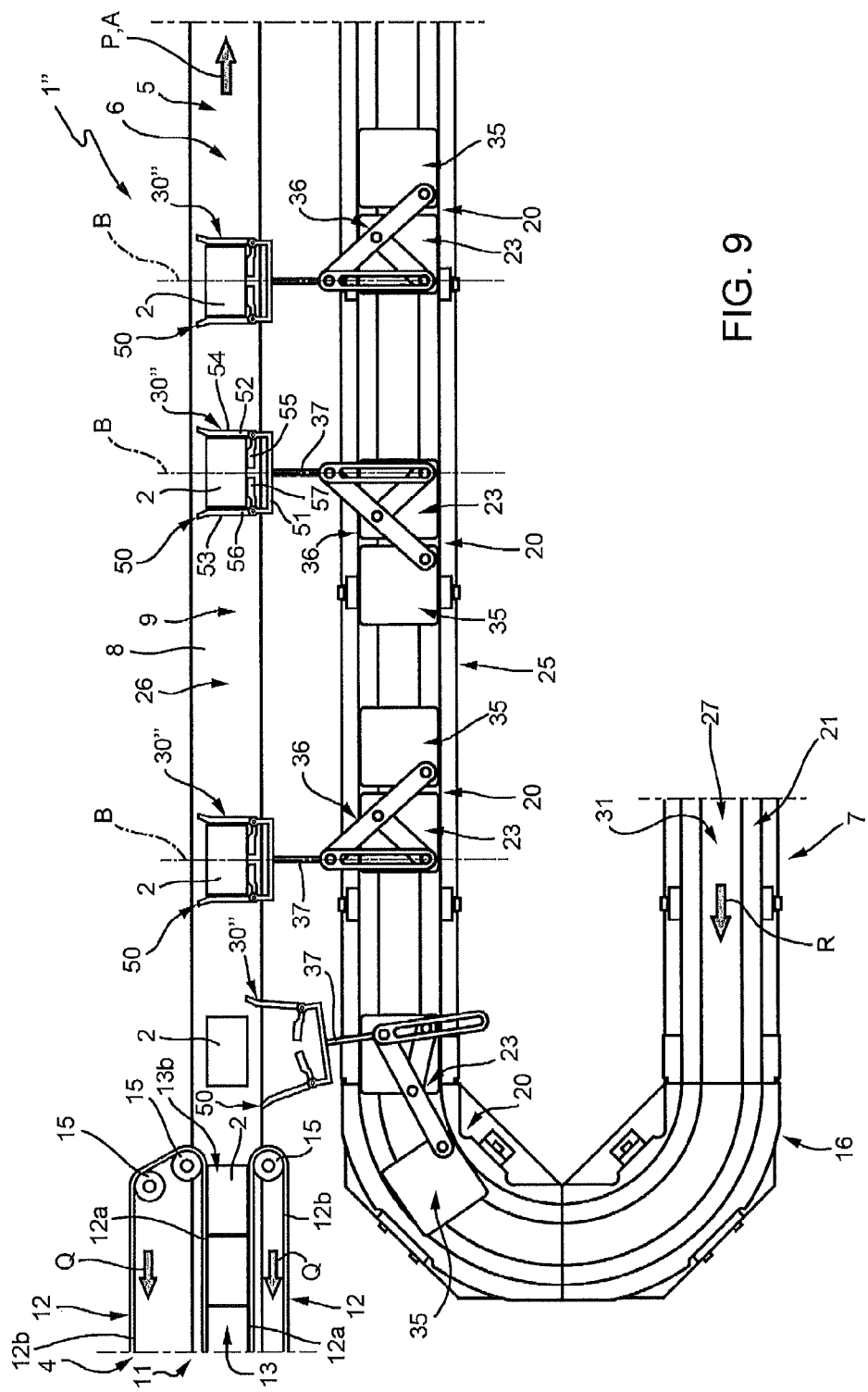
FIG. 9 shows a top view, with parts removed for clarity, of a second alternative embodiment of a unit in accordance with the present invention for sequencing and guiding packages while they are advanced from an input station to an output station.
Figure 10:
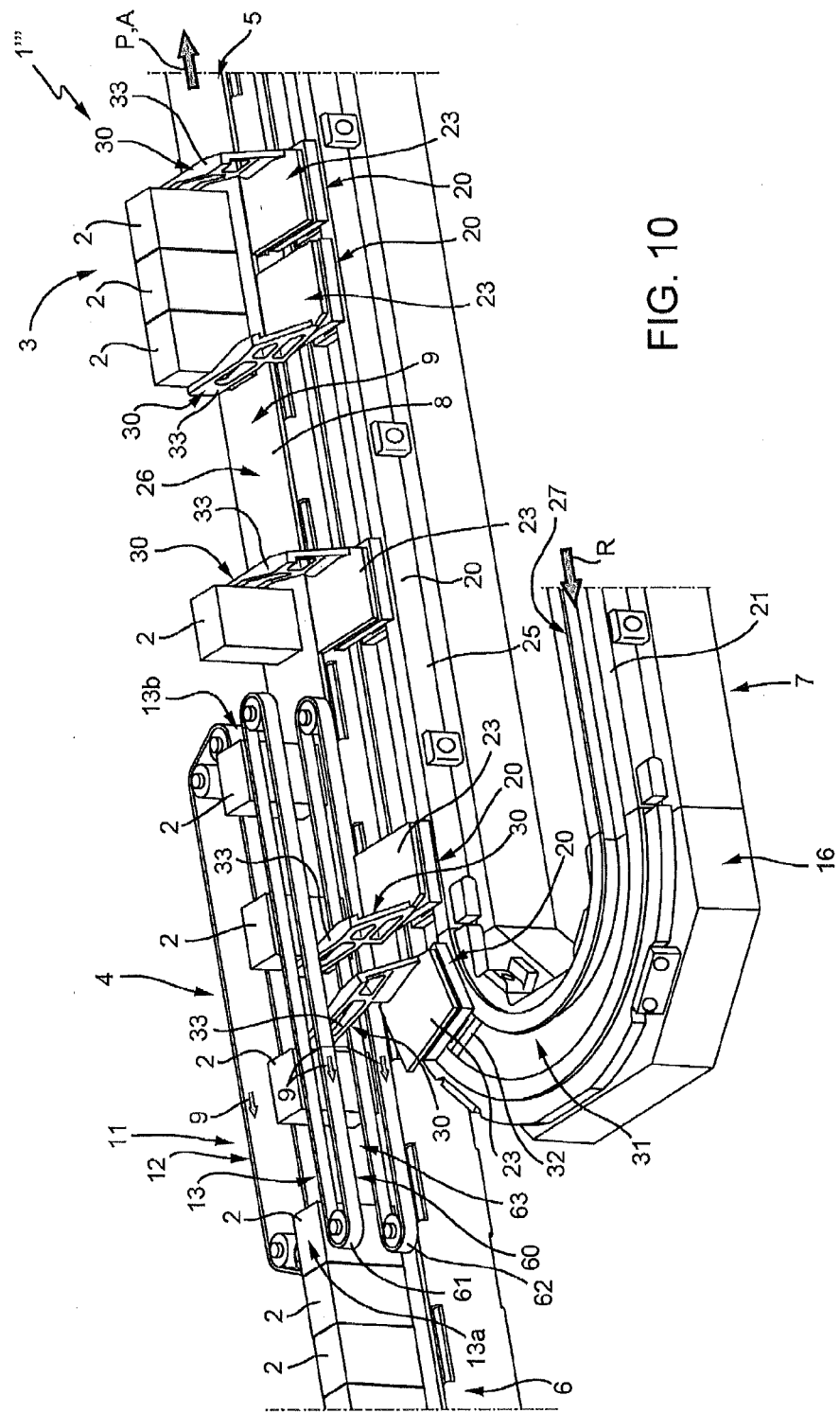
FIG. 10 shows a perspective view, with parts removed for clarity, of a third alternative embodiment of a unit in accordance with the present invention for sequencing and guiding packages while they are advanced from an input station to an output station.
Figure 11:
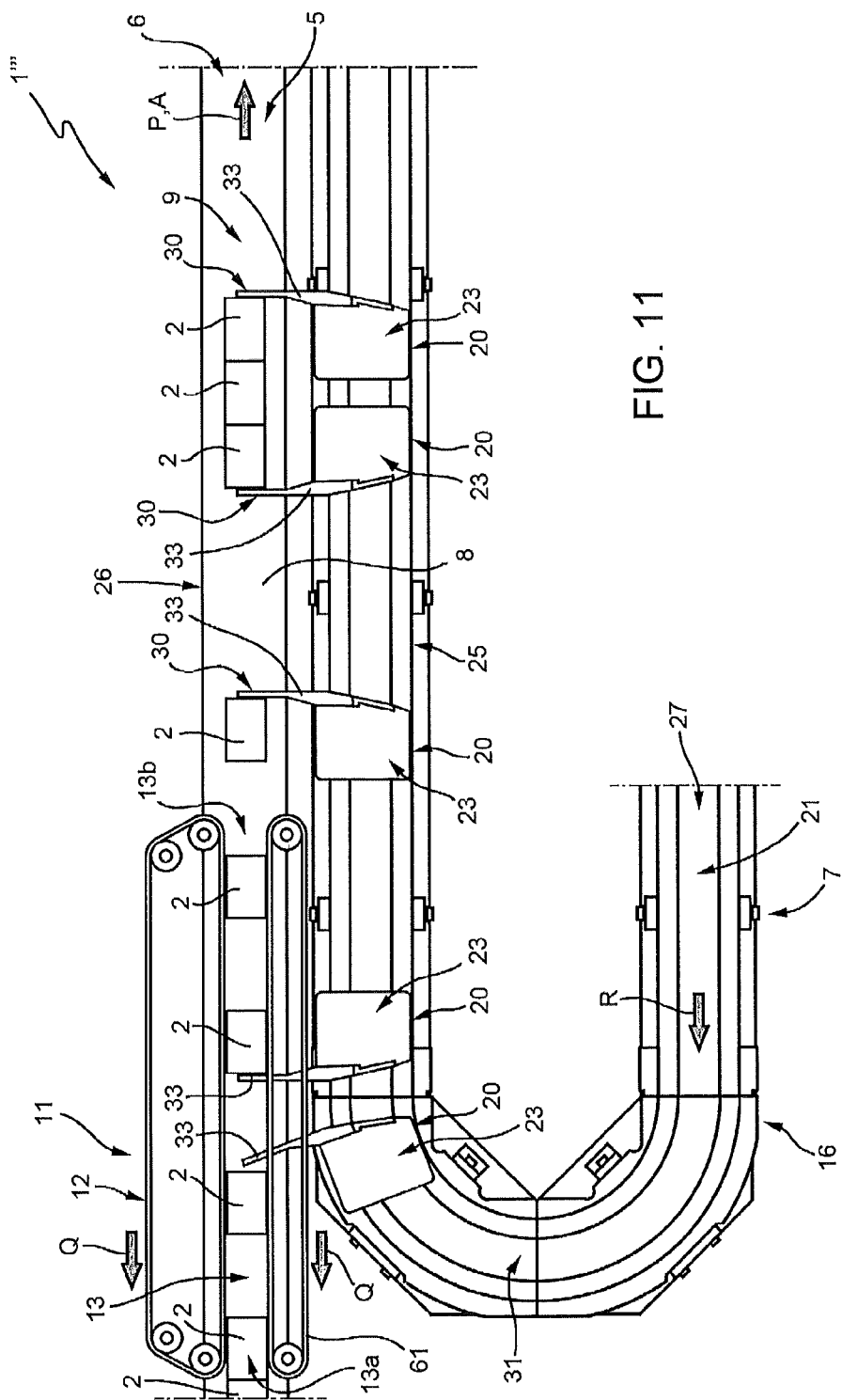
FIG. 11 shows a top view of the FIG. 10 unit.
Figure 12:
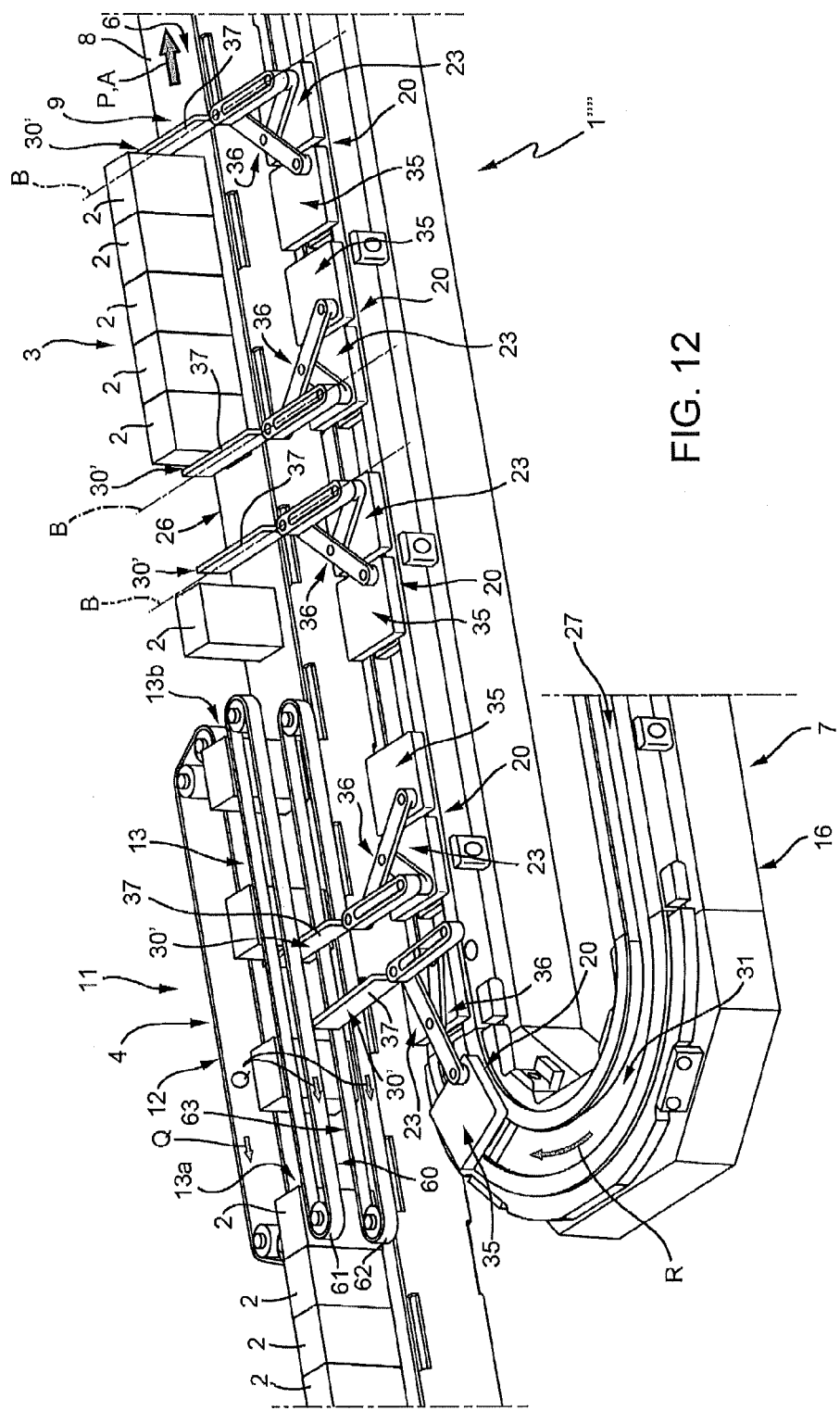
FIG. 12 shows a perspective view, with parts removed for clarity, of a fourth alternative embodiment of a unit in accordance with the present invention for sequencing and guiding packages while they are advanced from an input station to an output station.
Figure 13:
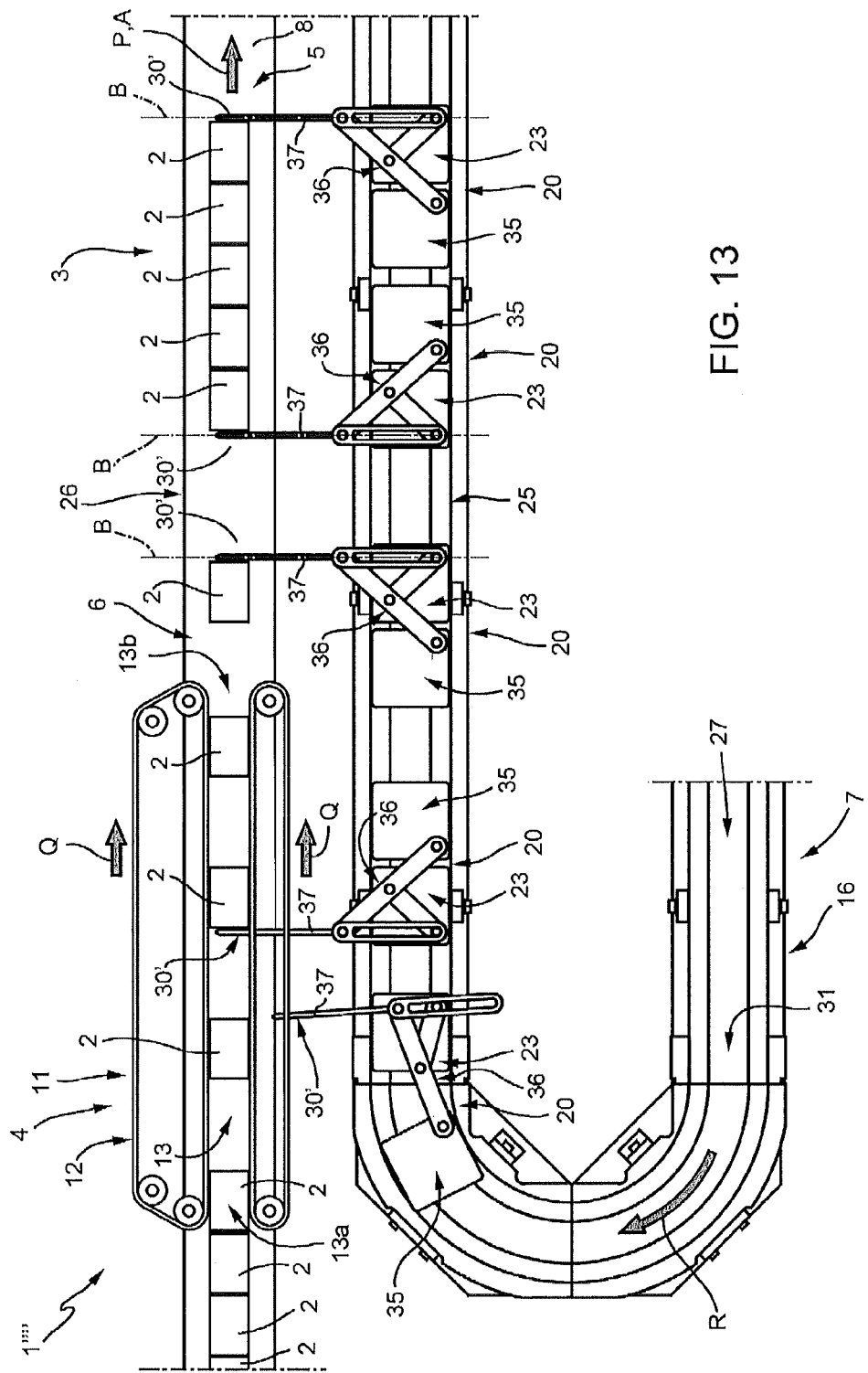
FIG. 13 shows a top view of the FIG. 12 unit.
Figure 14:
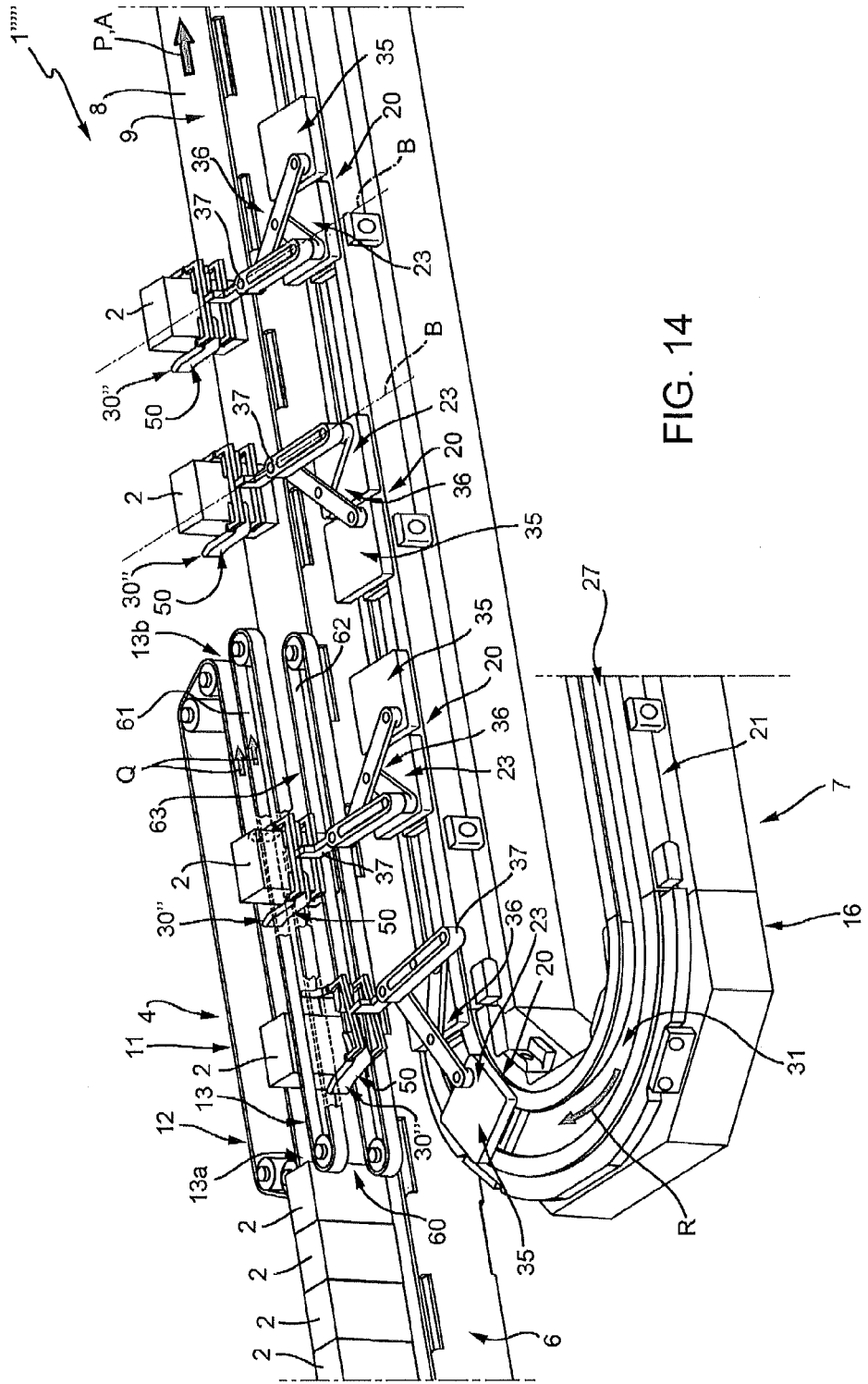
FIG. 14 shows a perspective view, with parts removed for clarity, of a fifth alternative embodiment of a unit in accordance with the present invention for sequencing and guiding packages while they are advanced from an input station to an output station.

Number 1" in FIG. 9 indicates as a whole a different embodiment of a unit in accordance with the present invention for sequencing and guiding packages 2 while such packages are advanced along transfer path P; units 1" and 1' being similar to each other, the following description is limited to the differences between them, and using the same references, where possible, for identical or corresponding parts.

Unit 1" basically differs from unit 1' by comprising, for each movable element 20, an interacting portion 30", which is similar to interacting portion 30' but is configured to interact with a single package 2. In particular, each interacting portion 30" is movable as interacting portion 30' along a relative displacement direction B transversal to work portion 25 of track 21 and is controlled by a relative pair of carts 23, 35 linked together by a linking mechanism 36.

Each interacting portion 30" only differs from interacting portions 30' by the fact that the relative arm 37 has a substantially C-shaped front end portion 50 capable of grabbing a relative package 2. In practice, the end portion 50 of each arm 37 defines a receiving seat for a single package 2.

More specifically, each end portion 50 comprises a front body 51, facing packages 2 carried by conveying surface 9 when the relative movable element 20 moves along work portion 25 of track 21, and two L-shaped levers 52, 53 respectively hinged to a leading portion and a trailing portion of body 50 with respect to path R and respectively adapted to cooperate with a leading part and a trailing part of a relative package 2 carried by conveying surface 9.

In greater detail, each lever 52 has a first portion 54, adapted to cooperate with a leading surface of a relative package 2 carried by conveying surface 9, and a second portion 55 orthogonal to portion 54 and adapted to cooperate with a surface of the package 2 facing front body 50; in a completely analogous manner, each lever 53 has a first portion 56, adapted to cooperate with a trailing surface of a relative package 2 carried by conveying surface 9, and a second portion 57 orthogonal to portion 56 and adapted to cooperate with the surface of the package 2 facing front body 50.

Levers 52, 53 are hinged to front body 50 about respective vertical axes, orthogonal to conveying surface 9.

During displacement of each arm 37 towards its operative position, contact between the relative package 2 and portions 55, 57 of relative levers 52, 53 produces a rotation of such levers 53, 53 towards the package 2 so as to grab the latter between portions 54, 56.

The operation of unit 1" is completely identical to the one of unit 1', with the only difference that each interacting portion 30" cooperates with a single package 2 to drive it to output station 5 at the desired spacing $D_f$ from the following package 2.

Numbers 1''', 1'''', 1''''' in FIGS. 10 to 14 indicate different embodiments of units in accordance with the present invention for sequencing and guiding packages 2 while such packages are advanced along transfer path P.

Units 1''', 1'''', 1''''' are similar to units 1, 1', 1" respectively and only differ from these latter units by the fact that the work portion 25 of track 21 extends in part in a position adjacent to braking device 11, and by the fact that the braking device 11 defines an access zone 60 for the interacting portions 30, 30', 30" of movable elements 20 so as to allow such interacting portions 30, 30', 30" to start to interact with the packages 2 at the input station 4.

In particular, in order to permit access of interacting portions 30, 30', 30" to packages 2 when such packages are moving through braking device 11, the belt 12 facing conveyor 16 is divided into two distinct belts 61, 62 placed at different heights so as to define therebetween an intermediate window 63 defining access zone 60.

In the example shown in FIGS. 10 to 14, belt 61 is placed in an upper position than belt 62 and cooperates with top lateral portions of packages 2; accordingly, belt 62 cooperates with bottom lateral portions of packages 2.

In use, when movable elements 20 are approaching work portion 25 of track 21, interacting portions 30, 30', 30" insert into window 63 between belts 61 and 62 and can start to interact with packages 2 carried by conveying surface 9.

In this way, packages 2 and batches 3 to be formed are put under control at input station 4 and up to output station 5.

The advantages of units 1, 1', 1", 1''', 1'''', 1''''' according to the present invention will be clear from the foregoing description.

In particular, sequencing apparatus 7 permits to put fully under control position, speed and acceleration of the packages 2 and batches 3 during the transfer from input station 4 to output station 5.

Moreover, the carts 23, 35, and therefore the packages 2 and the batches 3, can be driven with different position/speed/acceleration profiles along path P: as a matter of fact, each movable element 20 is independently driven from the other movable elements 20 and this results in an independent driving of packages 2 and batches 3 along path P.

In the solutions of units 1''', 1'''' and 1''''', the control and driving actions performed by movable elements 20 already start when the packages 2 are crossing braking device 11, i.e. when they are advanced through the input station 4.

Thanks to the fact that packages 2 are driven while they are lying on traditional conveyor 6, there is no need to provide additional conveying modules for transferring the packages from conveyor 6 to the carts of the linear motor conveyor 16. Moreover, the weight of the packages 2 is completely borne by conveying surface 9 of conveyor 6; this means that a reduced traction force is requested to move carts 23, 35 along track 21.

Furthermore, as packages 2 are not to be transferred from the conveyor 6 to carts 23, 35, there is a reduced risk to damage the packages 2 before forming the multi-packs.

Clearly, changes may be made to units 1, 1', 1", 1''', 1'''', 1''''' as described and illustrated herein without, however, departing from the scope as defined in the accompanying claims.

The invention claimed is:

1. A unit for sequencing and guiding items while they are advanced from an input station, in which said items are arranged at least in one line parallel to an advancing direction, to an output station, in which item batches, arranged according to desired spacings along the advancing direction and each formed by one or more items, are made available for a subsequent operation, said unit comprising:

a first conveyor for advancing said items;

a sequencing apparatus configured to cooperate with the items to form said batches and to drive the batches of items, arranged at the desired spacings, to said output station;

wherein said sequencing apparatus comprises a second conveyor in turn comprising a track and a plurality of movable elements independently movable along said track to interact with said items to drive them to said output station;

wherein said first conveyor is configured to carry said items from said input station to said output station, said track has a work portion distinct from said first conveyor, said movable elements are provided with respective interacting portions that protrude over said first conveyor when said movable elements are advanced along said work portion of said track, and the respective interacting portions cooperating with said items to drive them to the desired positions along said first conveyor so as to define said batches of items and to locate the batches of items at the desired distances from one another;

said interacting portions including a leading-type interacting portion and a trailing-type interacting portion, said leading-type interacting portion being configured to cooperate with a leading surface of a leading item of one of said batches of items, said trailing-type interacting portion being configured to cooperate with a trailing surface of a trailing item of said one of said batches of items; and the leading-type interacting portion and the trailing-type interacting portion that respectively cooperate with the leading surface of the leading item of the one of said batches of items and the trailing surface of the trailing item of the one of said batches of items are independently movable along the track as the items are being carried by the first conveyor.

2. The unit as claimed in claim 1, wherein said second conveyor is arranged at one side of said first conveyor.

3. The unit as claimed in claim 1, wherein each interacting portion is carried in a stationary position by a respective one of the movable elements and protrudes over said first conveyor when said movable element is advanced along said work portion of said track.

4. The unit as claimed in claim 1, wherein each interacting portion is carried by a respective one of the movable elements in a movable manner along a relative displacement direction transversal to said track and between a rest position, in which said interacting portion cannot interfere with the items advanced by said first conveyor, and an operative position, in which said interacting portion protrudes over said first conveyor for cooperating with said items.

5. The unit as claimed in claim 4, further comprising actuator means for controlling the movements of said interacting portions between said rest and operative positions.

6. The unit as claimed in claim 5, wherein each movable element comprises a first and a second cart independently drivable along said track and linked to one another and to a respective interacting portion by a linking mechanism, said actuator means for moving each interacting portion along the relative displacement direction comprising said first and second cart, which are drivable to vary the distance therebetween so as to obtain, through a respective linking mechanism, displacement of said interacting portion towards the operative position when said first and second cart move closer to one another and an opposite displacement when said first and second cart move away from one another.

7. The unit as claimed in claim 6, wherein, for each movable element, the relative linking mechanism comprises:
- a first lever having a first portion hinged to the relative first cart and a second portion hinged to the relative interacting portion;
- a second lever having a first portion hinged to the relative second cart and a second portion hinged to a third portion of said first lever interposed between said first portion and said second portion of the first lever; and
- guiding means carried by the relative second cart and receiving said interacting portion in a sliding manner along the relative displacement direction.

8. The unit as claimed in claim 7, wherein, for each movable element, said guiding means are defined by a pin for hinging said first portion of the relative second lever to the relative second cart, and wherein said interacting portion has a slot coupled with said pin in a sliding manner along the relative displacement direction.

9. The unit as claimed in claim 1, wherein at least two movable elements cooperate with each batch to drive it to said output station.

10. The unit as claimed in claim 1, wherein, for each batch to be formed having two or more items, a first one of said movable elements is configured to cooperate, through its interacting portion, with a leading surface of a leading item of said batch, and a second one of said movable elements is configured to cooperate, through its interacting portion, with a trailing surface of a trailing item of said batch, and wherein said first and second movable elements are independently driven to move closer to one another so as to group the items comprised therebetween and to form said batch.

11. The unit as claimed in claim 1, wherein each batch is formed by a single item and wherein one single movable element is configured to cooperate with each batch to drive it to said output station.

12. The unit as claimed in claim 11, wherein each interacting portion has a free end portion defining a receiving seat for a single item.

13. The unit as claimed in claim 1, wherein said input station comprises a braking device for cooperating with said items advanced by said first conveyor so as to generate a given initial spacing between each item and the following one.

14. The unit as claimed in claim 13, wherein said braking device comprises at least two endless belts arranged at the opposite sides of said first conveyor, defining therebetween a passage for the line of items and cooperating with the opposite sides of the items movable by said first conveyor so as to slow down them.

15. The unit as claimed in claim 14, wherein said belts are movable at a speed lower than the speed of said first conveyor so as to generate a queue of items at the inlet end of said passage and to separate one item at a time from the queue.

16. The unit as claimed in claim 13, wherein said work portion of said track of said second conveyor is arranged downstream from said braking device in the advancing direction of said items so that said movable elements can interact with said items after the items have left said braking device.

17. The unit as claimed in claim 13, wherein said work portion of said track of said second conveyor extends at least in part in a position adjacent to said braking device, and wherein said braking device defines an access zone for the interacting portions of said movable elements so as to allow said interacting portions to start to interact with the items at said input station.

18. The unit as claimed in claim 17, wherein one of said belts is divided into two distinct belts placed at different heights so as to define therebetween said access zone.

19. The unit as claimed in claim 1, further comprising individually-excitable solenoids, each of the individually-excitable solenoids being configured to independently move a corresponding one of the movable elements along the track.

20. A unit for sequencing and guiding items while they are advanced from an input station, in which the items are arranged at least in one line parallel to an advancing direction, to an output station, in which item batches, arranged according to desired spacings along the advancing direction and each formed by one or more items, are made available for a subsequent operation, the unit comprising:
- a first conveyor for advancing the items;
- a sequencing apparatus configured to cooperate with the items to form the batches and to drive the batches of items, arranged at the desired spacings, to the output station;
- wherein the sequencing apparatus comprises a second conveyor comprising a track and a plurality of movable elements independently movable along the track to interact with the items to drive the items to the output station;
- the first conveyor is configured to carry the items from the input station to the output station;
- the track includes a work portion distinct from the first conveyor;
- the movable elements are provided with respective interacting portions that protrude over the first conveyor when the movable elements are advanced along the work portion of the track, and cooperating with the items to drive the items to the desired positions along the first conveyor so as to define the batches of items and to locate the batches of items at the desired distances from one another; and
- for each batch to be formed having two or more items, a first one of the movable elements is configured to cooperate, through its interacting portion, with a leading surface of a leading item of the batch, and a second one of the movable elements is configured to cooperate, through its interacting portion, with a trailing surface of a trailing item of the batch, and wherein the first and second movable elements are independently driven to move closer to one another to group the items between the interacting portions of the first and second movable elements and form the batch.

* * * * *